US007333796B2

(12) United States Patent
Scalisi et al.

(10) Patent No.: US 7,333,796 B2
(45) Date of Patent: Feb. 19, 2008

(54) WIRELESS TELEPHONE SERVICE (75) Inventors: Joseph F. Scalisi, Brea, CA (US);
Desiree C. Mejia, Brea, CA (US);
David Morse, Mission Viejo, CA (US);
David Butler, Gloucester (GB)

(73) Assignee: Location Based Technologies, Inc., Anaheim, CA (US)

( * ) Notice: Subject to any disclaimer, the term of this patent is extended or adjusted under 35 U.S.C. 154(b) by 153 days.

(21) Appl. No.: 10/705,414

(22) Filed: Nov. 10, 2003

(65) Prior Publication Data

US 2005/0101291 A1    May 12, 2005

(51) Int. Cl.
*H04M 11/00* (2006.01)

(52) U.S. Cl. .................. 455/406; 455/408; 455/410; 379/114.14; 379/144.01

(58) Field of Classification Search ............. 455/406, 455/408, 410, 419, 414.1; 379/114.14–114.19, 379/127.02, 127.05, 127.06, 144.01
See application file for complete search history.

(56) References Cited

U.S. PATENT DOCUMENTS 6,157,823 A * 12/2000 Fougnies et al. ........... 455/406
6,167,251 A * 12/2000 Segal et al. ................ 455/406
6,373,930 B1 * 4/2002 McConnell et al. ... 379/114.28
2003/0078844 A1 * 4/2003 Takatori ..................... 705/17

* cited by examiner

*Primary Examiner*—Nay Maung
*Assistant Examiner*—Tuan H. Nguyen
(74) *Attorney, Agent, or Firm*—Law Office of Robert E. Kasody, P.C.

(57) ABSTRACT

A method for providing a wireless telephone service includes providing a wireless handset having an associated telephone number, and a dedicated programmable wireless switch coupled to a public switched telephone network and a billing server. The handset communicates with the switch to place and receive calls to and from selected telephone numbers on respective ones of a secured list, and optionally, a dependent list. Two billing accounts are associated with the handset, a secured account having a password and the telephone numbers of the secured list associated with it, and a dependent account having a password and the telephone numbers of the dependent list, if any, associated with it. Completed incoming calls to or from the handset in which the telephone number of the caller or the number being called corresponds to a number of the secured and dependent lists are debited to the secured and dependent accounts, respectively, and calls to and from other numbers are billed to the dependent account.

22 Claims, 6 Drawing Sheets

WIRELESS TELEPHONE SERVICE

CROSS-REFERENCE TO RELATED APPLICATIONS

This application is related to U.S. Pat. No. 5,574,772, filed Oct. 27, 1994, issued Nov. 12, 1996, and to co-pending applications Ser. No. 09/499,058, filed Feb. 4, 2000, and Ser. No. 09/638,587, filed Aug. 15, 2000.

STATEMENT REGARDING FEDERALLY SPONSORED RESEARCH OR DEVELOPMENT (Not Applicable)

REFERENCE TO APPENDIX (Not Applicable)

BACKGROUND OF THE INVENTION

1. Field of the Invention

This invention relates, in general, to wireless communications, and in particular, to a method for providing a wireless telephone service that enables a benefactor, such as a parent, guardian or an employer, to provide a beneficiary, such as a child, ward or employee, with essential wireless telephone communication services, including an ever ready emergency communication "safety net," at a low subscription cost, while eliminating or limiting the costs to the benefactor of the non-essential use of the service by the beneficiary.

2. Related Art

The recent global proliferation of wireless telephones and pagers is a testament both to the needs of people to communicate conveniently with others, regardless of their location and the availability of conventional fixed wire telephone services, as well as to the effectiveness of wireless services in filling those needs. Consequently, millions have subscribed to one or more wireless services, including cellular telephone, paging, and voice mail services, for reasons of both convenience and personal or business necessity.

In many instances, persons subscribe to such services for their own benefit, but in some instances, for the benefit of others as well. For example, most children or teenagers and many adults cannot afford to subscribe to a prepaid wireless service on their own behalf, or cannot qualify for a post-payment service because of credit or legal capacity issues. However, parents often subscribe to a cellular telephone or paging service on behalf of their children, and indeed, some adult children may subscribe to a service on behalf of infirm or elderly parents or other family members. In such cases, the primary reason for the benefactor subscribing on behalf of the beneficiary is often one of the security or safety of the beneficiary, i.e., the provision of a communication "safety net" that can be used by the beneficiary in emergency situations to summon help, or to reassure the benefactor of their whereabouts and safety. In other cases, such third-party subscribers may be employers who wish to provide their employees who are mobile, or who are otherwise away from a central office, with the ability to communicate on business matters with the home office or their co-workers conveniently and effectively, regardless of the employee's location.

However, such third-party service subscriptions are not without certain potential cost drawbacks. For example, the provision of a cellular telephone to a teenager on an unlimited, guaranteed post-payment basis can quickly become a very expensive arrangement for the parent, for reasons that will be appreciated by most parents. On the other hand, if the dependent is provided with the service on a pre-paid basis, a profligate use of the service by the dependent can quickly exhaust all of the available "air time" credit in the account, making it impossible for the dependent to make or receive calls, and substantially diminishing the "safety net" aspect of the subscription. A similar situation obtains in the employer-employee context, i.e., unlimited use of a wireless telephone by an employee for personal or non-business related calls can become either prohibitively expensive for the employer, or render the service unusable for essential business purposes.

A long felt but as yet unsatisfied need therefore exists for a method for providing a wireless telephone service that enables a benefactor, such as parent, guardian, employer, or the like, to provide a beneficiary, such as a child, relative, ward, employee, or the like, with essential telephone needs, including paging, voice mail, and an inexhaustible emergency communication "safety net," at a low subscription cost, while eliminating or limiting the costs to the benefactor of the non-essential usage of the service by the beneficiary.

BRIEF SUMMARY OF THE INVENTION

In accordance with the present invention, a method is disclosed for providing a wireless telephone service that enables a benefactor to provide a beneficiary with essential wireless telephone needs, including paging, voice mail, and an inexhaustible emergency communication "safety net," at a low subscription cost, while retaining a substantial amount of control over the cost to the benefactor of the non-essential usage of the service by the beneficiary.

In one exemplary embodiment thereof, the method comprises the provision of a dedicated programmable wireless telephone switch coupled to a public switched telephone network ("PSTN"), a voice mail server, and a billing server. A wireless handset having an associated telephone number is also provided for use with the service. The handset is capable of telephonic communication with the dedicated switch, and through the switch, of placing and receiving telephones calls to and from, among others, telephone numbers on a "secured" list of telephone numbers that is "provisioned," or programmed, in the switch.

At least two billing accounts are associated with the telephone number of the handset. These accounts comprise a secured account having a password and the telephone numbers of the secured list associated with it, and a dependent account having a second password associated with it. In operation, the dedicated switch detects the telephone number of a caller of an incoming call to the handset, or if none is detected, may prompt the calling party to provide a password, and for outgoing calls from the handset, the switch detects the telephone number being called. If the detected number of an inbound caller is on the secured list or the caller provides the password of the secured account, or if the number of an outbound call is on the secured list, then the secured account is debited for the completed call. If the number of an inbound caller is not on the secured list, or the caller does not provide the password of the secured account, or if the number of an outbound call is not on the secured list, then the secured account is debited for the completed call.

In another advantageous embodiment, a second, "dependent" list of telephone numbers may be programmed in the switch and associated with the dependent billing account. In operation, the dependent account is debited for completed incoming and outgoing calls to and from the handset that are made to and from telephone numbers that are on the dependent list, as follows. For outgoing calls from the handset, the switch first determines whether the telephone number being called by the user corresponds to one of the numbers on the secured or the dependent list. The switch then determines whether credit is available in the account that is to be billed for the call. If credit is not available in the appropriate account, the user is so advised by the switch, and the call cannot be completed. If credit is available in the appropriate account, the switch rings the number being called, and if the call is answered, meters the length of the call, and debits the cost of the call to the secured account, if the call was to a number on the secured list, or to the dependent account, if the number called was on the dependent list.

For incoming calls to the handset, the switch first attempts to detect the telephone number, i.e., the caller identification number, of a caller calling the handset. If the telephone number of the caller cannot be detected, then the switch prompts the caller for the secured account password. If the telephone number of the caller corresponds to a number on the secured list, or if the caller provides the secured account password when prompted, the switch then determines if credit is available in the secured account, and if it is not, provides the caller with the option of leaving a voice mail message for the user on the voice mail server at no charge. If credit is available in the secured account, the switch then rings the handset to determine whether the user of the handset is available to receive the call, and if the user answers the ring, the switch connects the call to the user, meters the length of the call, and debits the cost of the call to the secured account. If the user does not answer the call, the switch provides the caller with the option of leaving a voice mail message for the user on the voice mail server at no charge.

If the telephone number of the caller corresponds to a number on the dependent list, the switch then determines if credit is available in the dependent account, and if not, provides the caller with the option of leaving a voice mail message for the user on the voice mail server at no charge. If credit is available in the dependent account, the switch then rings the handset to determine whether the user of the handset is available to receive the call. If the user answers the ring, the switch connects the call to the user, meters the length of the call, and debits the cost of the call to the dependent account. If the user does not answer the call, the switch provides the caller with the option of leaving a voice mail message for the user on the voice mail server at no charge.

If the telephone number of the caller does not correspond to a number on either the secured list or the dependent list, and if the caller does not provide the password of the secured account when prompted for it, then two alternative embodiments may be provided for by the service. In a more restrictive embodiment, the switch provides the caller only with the option of leaving a voice mail message for the user on the voice mail server. In a less restrictive embodiment, the switch treats the incoming call as one from a telephone number on the dependent list, as above.

In another possible embodiment, the dedicated switch can be provisioned such that the handset cannot make and/or receive calls to and/or from any numbers that are not on one of the two lists, except emergency calls to 911, which are always connected through by the switch, regardless the credit in either account.

In another advantageous embodiment of the method in which at least one of the telephone numbers of the secured list includes a home location telephone number that is provided by a fixed wire telephone provider, the method can provide an additional level of "safety net" communications. In this embodiment, the dedicated switch can be programmed to determine, in the case of an inbound call, whether the telephone number of the caller of an incoming call to the handset corresponds to a telephone number of the secured list, or in the case of an outbound call, whether the number being called corresponds to such number. If the number calling, or the number being called, corresponds to a telephone number of the secured list, the caller or handset user can be given the option of charging the cost of the call to the home location number through the fixed wire provider, and if the caller or user elects the option, the call will be put through, regardless of the credit balance in the secured account, and the cost of the call is charged instead to the home location number through the fixed wire provider.

In another advantageous embodiment, a method is provided for a caller making an incoming call to the handset, or the user of the handset making an outgoing call, to "refresh," or add free credit to a billing account that lacks sufficient credit to permit the call to go through. In this embodiment, in addition to the respective options above of a incoming caller leaving a voice mail for the user on the mail server, or the user terminating an outbound call, the caller or user may be provided with an alternative option of listening to a brief advertisement provided by a sponsor, in exchange for a certain amount of credit being added to the deficient account. In this way, sufficient "free" credit can be added to the appropriate account to enable the call to go through.

In another advantageous embodiment of the method, a third billing account can be associated with the telephone number of the handset comprising an "alert service" account. The alert service account has an associated third password and third, alert service list of telephone numbers programmed in the switch. In this embodiment of the method, the switch is programmed to call the user of the handset at selected times and selected intervals, e.g., every day of the week at 8:00 a.m., and if the user answers the call, to play, in the case of an audio message, or display, in the case of a text message, a first pre-recorded message to the user of the handset, e.g., "take your insulin."

The switch then prompts the user to acknowledge receipt of the message, and if the user either does not answer the call, or does not acknowledge receipt of the message, within a selected period of time, the switch then initiates an "escalation" procedure, which comprises not only repeating the first message call to the user at selected intervals after the first call, but also sequentially calling the telephone numbers on the alert service list, and if a respondent at one of the numbers on the alert service list answers the call, playing or displaying a second pre-recorded message identifying the user, and stating that the user failed to acknowledge receipt of the first message. The switch then prompts the respondent to acknowledge receipt of the second message, and then repeats the foregoing steps continuously until receipt of the first or the second message is respectively acknowledged by the user or a alert service list respondent.

In another advantageous embodiment, the dedicated switch can be connected with the internet, and a customer, such as the owner of the secured account or a user of the handset, or a representative of such customers, can log onto a web page associated with service, and upon supplying the appropriate account numbers and passwords associated therewith, obtain the status of the accounts, such as the secured account, the dependent account, or the alert service account, and additionally, modify certain of the functional features the dedicated switch related to those accounts, e.g., the telephone numbers of the secured list, the dependent list, and the alert service list.

In another embodiment in which the dedicated switch is connected to the internet, the switch can be programmed to store voice mails left for the user on the voice mail server, or convert them into, digital sound files, e.g., "*.wav" files, and then transmit them to an e-mail address of the user via the internet.

A better understanding of the above, and many other feature and advantages of the method of the present invention may be obtained from a consideration the detailed description thereof below, particularly if such consideration is made in conjunction with the several views of the appended drawings.

DETAILED DESCRIPTION OF THE INVENTION

Figure 1:
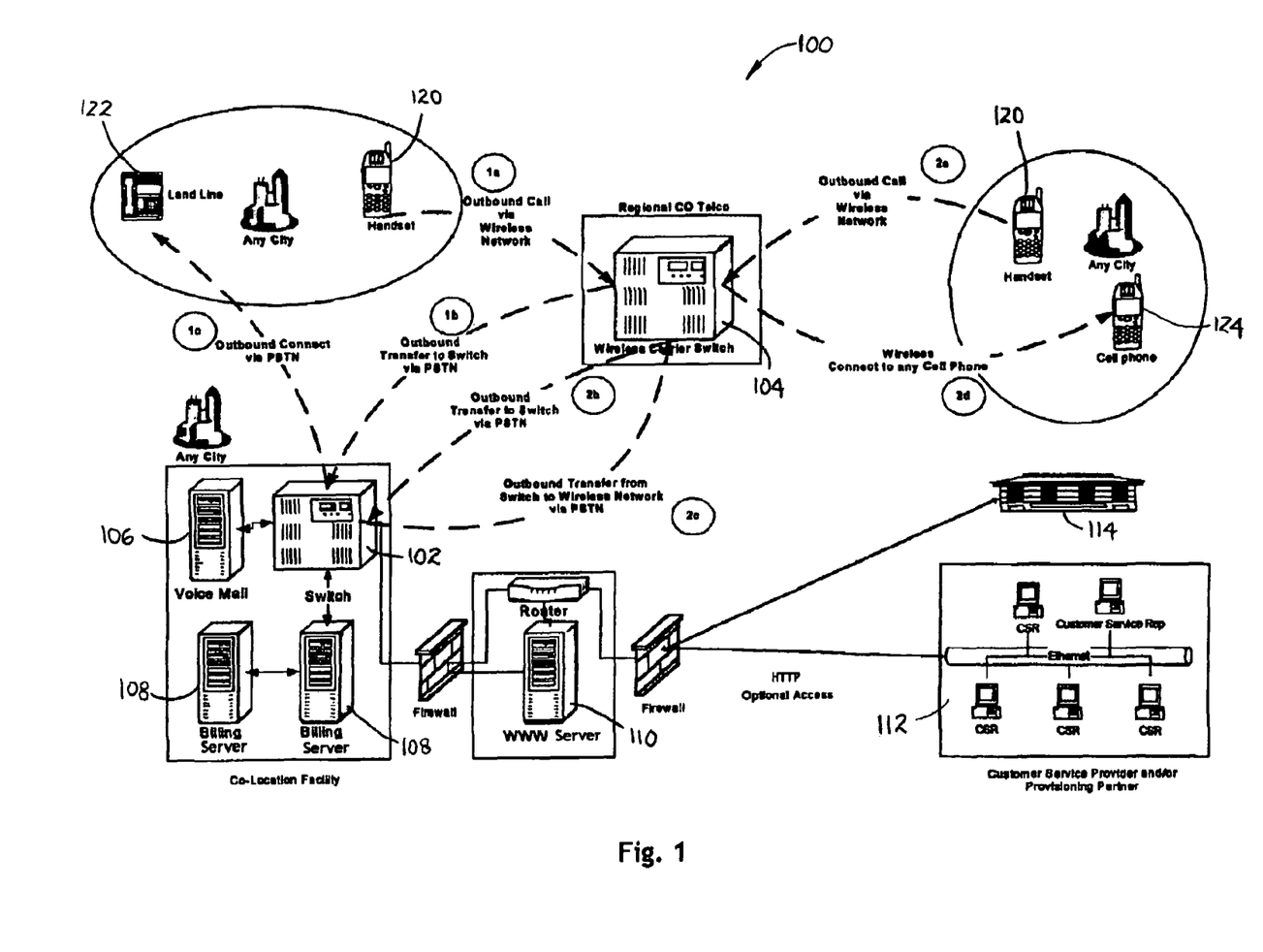
FIG. 1 is a diagram of equipment platform used in an exemplary embodiment of a method for providing a wireless telephone service in accordance with the present invention.

FIG. 1 is a diagram illustrating an equipment platform 100 used in an exemplary embodiment of a method for providing a wireless telephone service in accordance with the present invention. In the particular embodiment illustrated in FIG. 1, the method comprises the provision of a dedicated, programmable wireless switch 102 that is coupled to a regional wireless carrier switch 104, a conventional public switched telephone network, or "PSTN" (not illustrated), a voice mail server 106, and a billing server 108.

In the particular exemplary embodiment illustrated in FIG. 1, the dedicated switch 102 is shown separate and distinct from the regional wireless carrier switch 104, as might be implemented in an embodiment of the method in which the wireless service described herein was provided by a so-called "mobile virtual network operator" ("MVNO"). However, as will be recognized by those of skill in this art, it is also possible for the service to be provided by the regional carrier itself, in which case, the dedicated switch of the service provider would merge into, and become one with, the wireless switch of the carrier.

Advantageously, the dedicated switch may also be coupled to the internet via an internet service provider 110, and through the internet, to a customer representative located at a remote customer service provider facility 112, or to a customer at, for example, his home 114. This arrangement enables the customer or a customer representative not only to obtain 24-hour access to current information regarding the status of the customer's account, but also to program, or provision, certain functional features of the dedicated switch 102 relating to the customer's account, as described in more detail below.

As illustrated in FIG. 1, the method also comprises the provision of a wireless telephone handset 120 for use with the service. The handset has a conventional telephone number associated with it, and is capable of wireless telephonic communication with the dedicated switch 102, and through the switch, of placing and receiving telephones calls to and from, among others, the telephone numbers on at least one list, comprising a "secured" list of telephone numbers programmed in the dedicated switch, and optionally, the telephone numbers on a second, "dependent" list, as well.

Further in accordance with the method of the present invention, at least two billing accounts associated with the telephone number of the handset are provided. The accounts comprise a "secured" account having a first password and the telephone numbers of the secured list associated with it, and a "dependent" account having a second password, and the telephone numbers of the dependent list, if any, associated with it. The owner of the secured account has certain rights with respect that account, as described below, including the right to determine what telephone numbers are programmed in the secured list of telephone numbers. The owner of the secured account, i.e., the user of the handset 120, has certain rights with respect that account, as described below, including the right to determine what telephone numbers are programmed in the dependent list of telephone numbers, if any.

In the particular embodiment illustrated in FIG. 1, two generalized scenarios of outgoing calls from the handset are shown, one in which a call is placed from the handset to a respondent at a telephone number associated with a conventional land line telephone 122, which may be in a city remote from that of the user of the handset, and the other in which a call is placed from the handset to the telephone number of a respondent at a telephone number of a conventional cellular telephone 124. In the first scenario, the outgoing call is routed (1a) from the handset 120 to the carrier switch 104 via the carrier's wireless network, and thence (1b), to the dedicated switch 102 via the PSTN. The dedicated switch, in accordance with the methods described below, then routes (1c) the call to the conventional land line telephone set 122 via the PSTN. An incoming call to the handset from a caller on at the telephone set 122 generally follows the reverse of the call routing shown, but again, in accordance with the methods described below.

In the second scenario illustrated in FIG. 1, the outgoing call is routed (2a) from the handset 120 to the carrier switch 104 via the carrier's wireless network, and thence (2b), to the dedicated switch 102 via the PSTN. The dedicated switch, in accordance with the methods described below, then routes (2c) the outgoing call back to the carrier switch via the carrier's wireless network, and the carrier switch then routes (2d) the call to the respondent at the cell phone 124 via the carrier's network. An incoming call to the handset from the cell phone 124 generally follows the reverse of the routing shown, again in accordance with the methods described below.

Turning now to the more specific operational details of the method of the present invention, and with reference to FIG. 1, for outgoing calls from the handset 120, the dedicated switch 102 first determines the caller identification number, or telephone number, of the handset, then whether the telephone number being called by the user of the handset corresponds to one of the numbers of either the secured list or the dependent list, if any, above. It should be understood that, if desired, the switch can be programmed such the handset cannot place calls to, and/or receive calls from, any telephone numbers that are not on one of the two lists, except for outgoing emergency calls to, e.g., "911", or a customer service number, which are always connected through by the switch, regardless of the availability of credit in either billing account.

The switch 102 then determines whether credit is available in the account that is to be billed for the call. Where no dependent list of numbers has been provisioned in the switch, completed incoming to and outgoing calls from the handset 120 which are not to be debited to the secured account are debited to the dependent account. If credit is not available in the appropriate account, the user is advised of that in a message generated by the switch, and the outgoing call is not connected, although other options described below, e.g., refreshing the credit in the depleted account, or billing the cost of the outgoing call to another number, can be made available to the user. If credit is available in the appropriate account, the switch rings the number being called, and if the call is answered, meters the length of the call, and debits the cost of the call either to the secured account, if the call was made to a number on the secured list, or to the dependent account, if the number called was on the dependent list.

Figure 2:
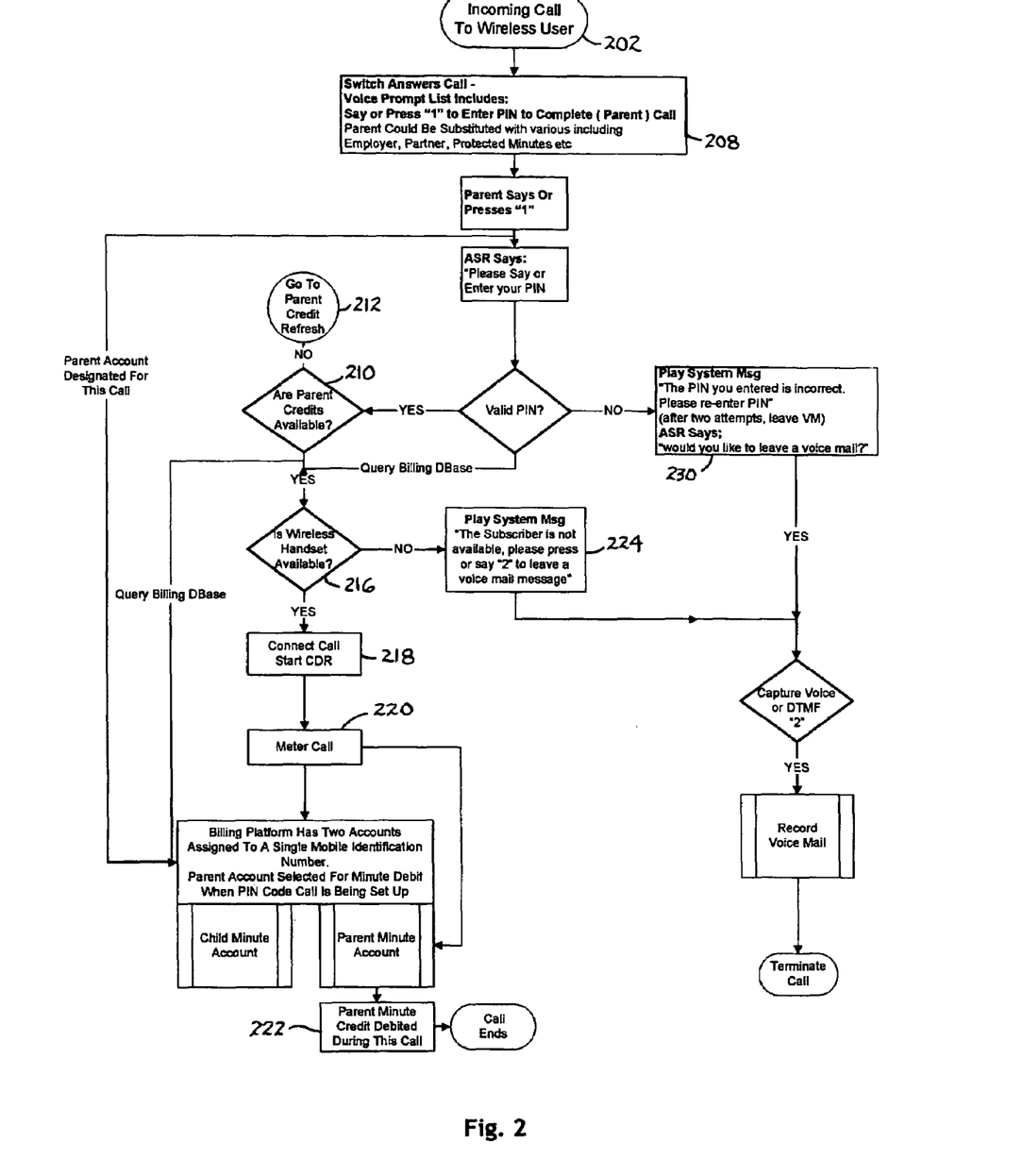
FIG. 2 is a call flow logic diagram of an incoming call to a wireless handset in accordance with an exemplary embodiment of the method.
Figure 3:
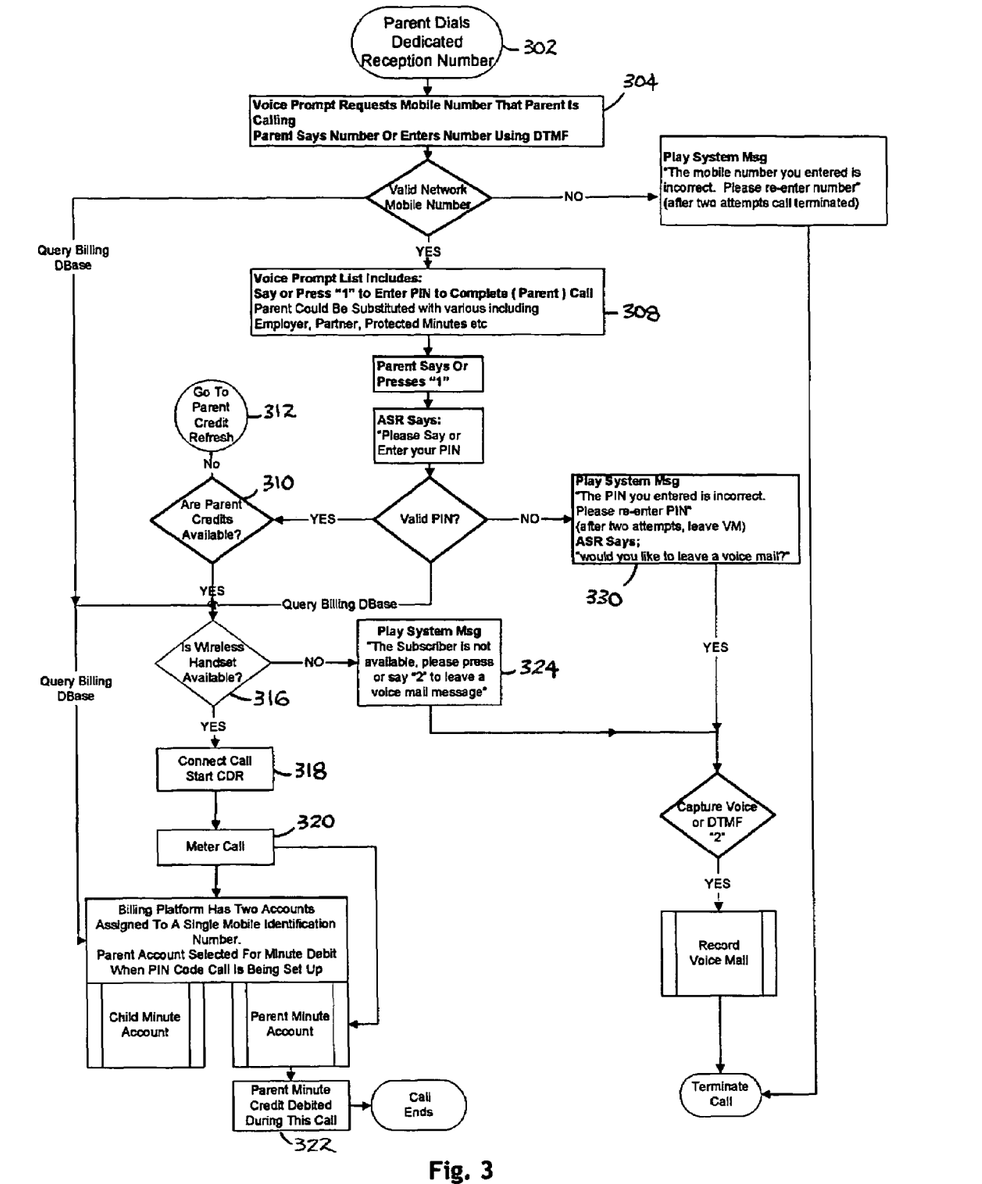
FIG. 3 is a call flow logic diagram of an incoming call to the wireless handset in accordance with another exemplary embodiment of the method.
Figure 4:
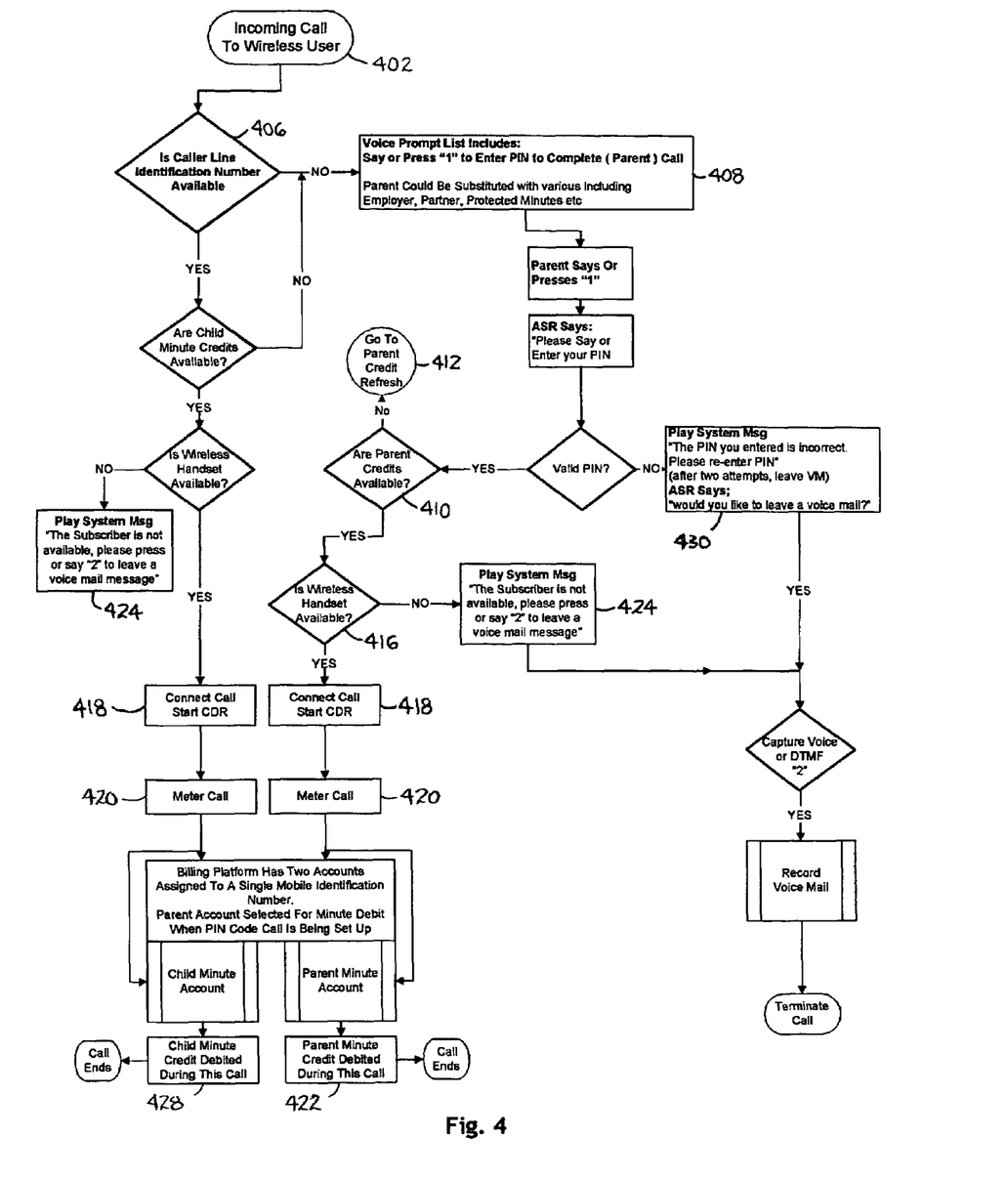
FIG. 4 is call flow logic diagram of an incoming call to the wireless handset in accordance with yet another exemplary embodiment of the method.
Figure 5:
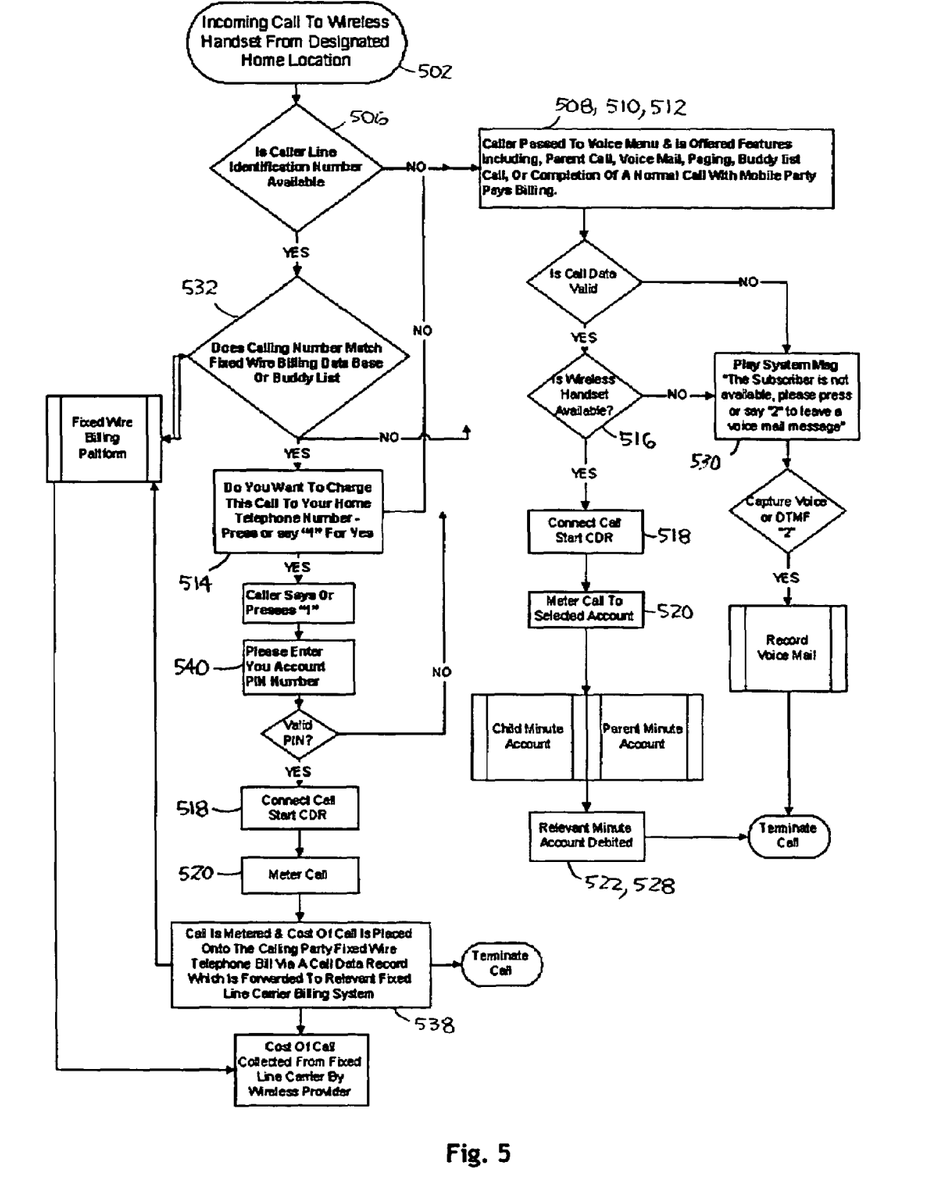
FIG. 5 is a call flow logic diagram of an incoming call to the wireless handset in accordance with still yet another exemplary embodiment of the method; and, FIG. 6 is a call flow logic diagram showing the setup of an alert service by a customer or a customer's representative in accordance with another exemplary embodiment of the method.

For incoming calls to the handset 120, and with reference to the call flow logic diagrams of FIGS. 2-5, the call may be initiated in some cases by calling the handset number directly (202, 402, 502), as respectively shown in FIGS. 2, 4, and 5, or alternatively, by calling a dedicated "reception" number (302), as shown in FIG. 3. In the latter case, the dedicated switch 102 then prompts the caller for the telephone number of the handset being called (304). In the embodiments of FIGS. 4 and 5, the switch then attempts to detect the caller identification number, i.e., the telephone number, of the party calling the handset (406, 506). If the switch cannot detect the telephone number of the caller, either because the caller is "behind" a telephone exchange, or "PBX," or is using "caller I.D. blocking," or alternatively, if the switch is so provisioned, the switch may prompt the caller for the secured account password (208, 308, 408, 508). In the exemplary embodiments illustrated, the response of a caller or the user of the handset to a prompt of the switch can be input to the switch by means of either Dual Tone Multi-frequency ("DTMF") tones ("press 1"), or by speech recognition means ("say 1"), or both ("press or say 1").

If the detected telephone number of the caller corresponds to a number on the secured list, or if the caller provides the secured account password when prompted, the switch 102 then determines if credit is available in the secured account (210, 310, 410, 510). If credit is not available in the secured account, the caller may be given the opportunity to "refresh" the credit in the secured account (212, 312, 412, 512) in one of several possible ways, as described below, or to charge the call to another, fixed wire telephone account (514), as illustrated in FIG. 5 and described below.

If credit is available in the secured account, the switch 102 then rings the handset 120 to determine whether the user of the handset is available to receive the call (216, 316, 416, 516), and if the user answers the ring, the switch connects the call to the user (218, 318, 418, 518), meters the length of the call (220, 320, 420, 520), and debits the cost of the call to the secured account (222, 322, 422, 522). If the handset user does not answer the call, the switch provides the caller with the option of leaving a voice mail message for the user on the voice mail server 106 (224, 324, 424, 524) at no charge to either account.

On the other hand, if the detected telephone number of the caller corresponds to a number on the dependent list, the switch 102 then determines if credit is available in the dependent account (426), as illustrated in FIG. 4, and if it is not, may prompt the caller for the secured account password (408), or provide the caller with the option of leaving a voice mail message for the user on the voice mail server 106 (424) at no charge to either account. If the caller responds with the correct password, the call is treated as one from a number on the secured list, as above. If credit is available in the dependent account, the switch then rings the handset to determine whether the user of the handset is available to receive the call (416). If the user answers the ring, the switch connects the call to the user (418), meters the length of the call (420), and debits the cost of the call to the dependent account (428, 528). If the handset user does not answer the call, the switch provides the caller with the option of leaving a voice mail message for the user on the voice mail server 106 (424) at no charge.

If the telephone number of the caller does not correspond to a number on either the secured list or the optional dependent list, and if the caller does not provide the password of the secured account when prompted to do so, then two alternative embodiments are provided by the service. In a more restrictive embodiment, the switch 102 provides the caller only with the option of leaving a voice mail message for the user on the voice mail server (230, 330, 430, 530) at no charge to either account. In a less restrictive embodiment, the switch can treat the incoming call as one from a telephone number on the dependent list, as described above.

The wireless telephone service provided by the method of the invention can offer an even greater flexibility in terms of call billing, and provide an additional level of "safety net" communication, where at least one of the telephone numbers of the secured list includes a home location telephone number that is provided by a fixed wire telephone provider, as illustrated in the call flow diagram of FIG. 5. In this embodiment, the switch 102 can be programmed to determine whether the telephone number of the caller of an incoming call to the handset 120, or the number of an outbound call from the handset, corresponds to a telephone number on the secured list (532).

If the number calling (or being called) corresponds to a number of that list, then the switch can be programmed to automatically connect the call to the handset (534) (or the handset to the number being called), meter the length of the call (536), and then charge the cost of the call to the home location number through the fixed wire provider (538), such that the charge appears on the phone bill of the home location telephone. Alternatively, the switch can first provide the caller (or the user) with an option of charging the call to the home location telephone number (514), and, optionally, prompt the caller (or user) for the secured account password (540), and if the correct password is entered, then proceed with the call as above. This arrangement not only provides a convenient alternative to the need for frequently replenishing the credit in the secured account, but can also reduce the concerns of a parent or employer needing to contact a child or employee, or vice-versa, in an emergency, when the secured account is devoid of credit.

In another advantageous embodiment, a method is provided for a caller making an incoming call to the handset 120, or the user of the handset making an outgoing call, to "refresh" (212, 312, 412), i.e., add "free" credit, to a billing account that lacks sufficient credit to permit a call to be connected. In this embodiment, in addition to the respective options above of a incoming caller leaving a voice mail for the user on the voice mail server 106 (224, 324, 424, 524), or the user simply terminating an outbound call, the caller or user may be provided with an alternative option of listening to a brief pre-recorded advertisement provided by a sponsor, in exchange for a certain amount of calling time credit being added to the deficient account. In this way, sufficient "free" credit can be added to the appropriate account to enable the incoming or outgoing call to go through, as described above. This optional embodiment thus provides a means for callers or users to replenish the secured and dependent accounts at no financial cost to themselves, and for sponsors to get their advertising messages before a widespread audience at a relatively low cost.

In another advantageous embodiment of the method, a third billing account can be associated with the telephone number of the handset 120 comprising an "alert service" account. The alert service account has an associated third password, and an associated third, alert service list of telephone numbers programmed in the dedicated switch 102. In this embodiment of the method, the switch is programmed to call the user of the handset at selected times and selected intervals, and if the user answers the call, to play, in the case of an audio message, or display, in the case of a text message, a first pre-recorded message to the user of the handset, e.g., "it's time to take your insulin."

The switch 102 then prompts the user to acknowledge receipt of the message, and if the user either does not answer the call or does not acknowledge receipt of the message within a selected period of time, the switch then initiates an "escalation" procedure, in which it not only repeats the first message call to the user at selected intervals after the first call, but also sequentially calls the telephone numbers on the alert service list. If a respondent at one of the numbers of the alert service list answers the call, it plays or displays a second pre-recorded message which identifying the user of the handset 120 by name, and states that the user failed to acknowledge receipt of the first message, which can also be played or displayed to the respondent. The switch then prompts the respondent to acknowledge receipt of the second message, and repeats the preceding steps continuously until a receipt of the first or the second message is respectively acknowledged by the user of the handset or an alert service list respondent.

The foregoing alert service embodiment enables a subscriber, on behalf of himself or another, to obtain a substantial measure of reassurance that important or critical acts or events, such as the taking or administration of medications, will not be overlooked or forgotten by the user of the handset 120, or that if something has happened to the user that prevents the user from acknowledging the first message, others concerned will notified of that and can react to it timely.

In another advantageous embodiment, the dedicated switch 102 can be connected with the internet through an internet service provider 110, as illustrated in FIG. 1, and a customer, such as the owner of the secured account, or a user of the handset 120, or a representative of the customers, can log onto a web page associated with the service, and upon supplying the appropriate account numbers and passwords associated therewith, obtain the status of the accounts, such as the secured account, the dependent account, or the alert service account, and additionally, provision or modify certain of the functional features the dedicated switch related to those accounts, e.g., the telephone numbers of the secured list, the dependent list, and the alert service list.

Figure 6:
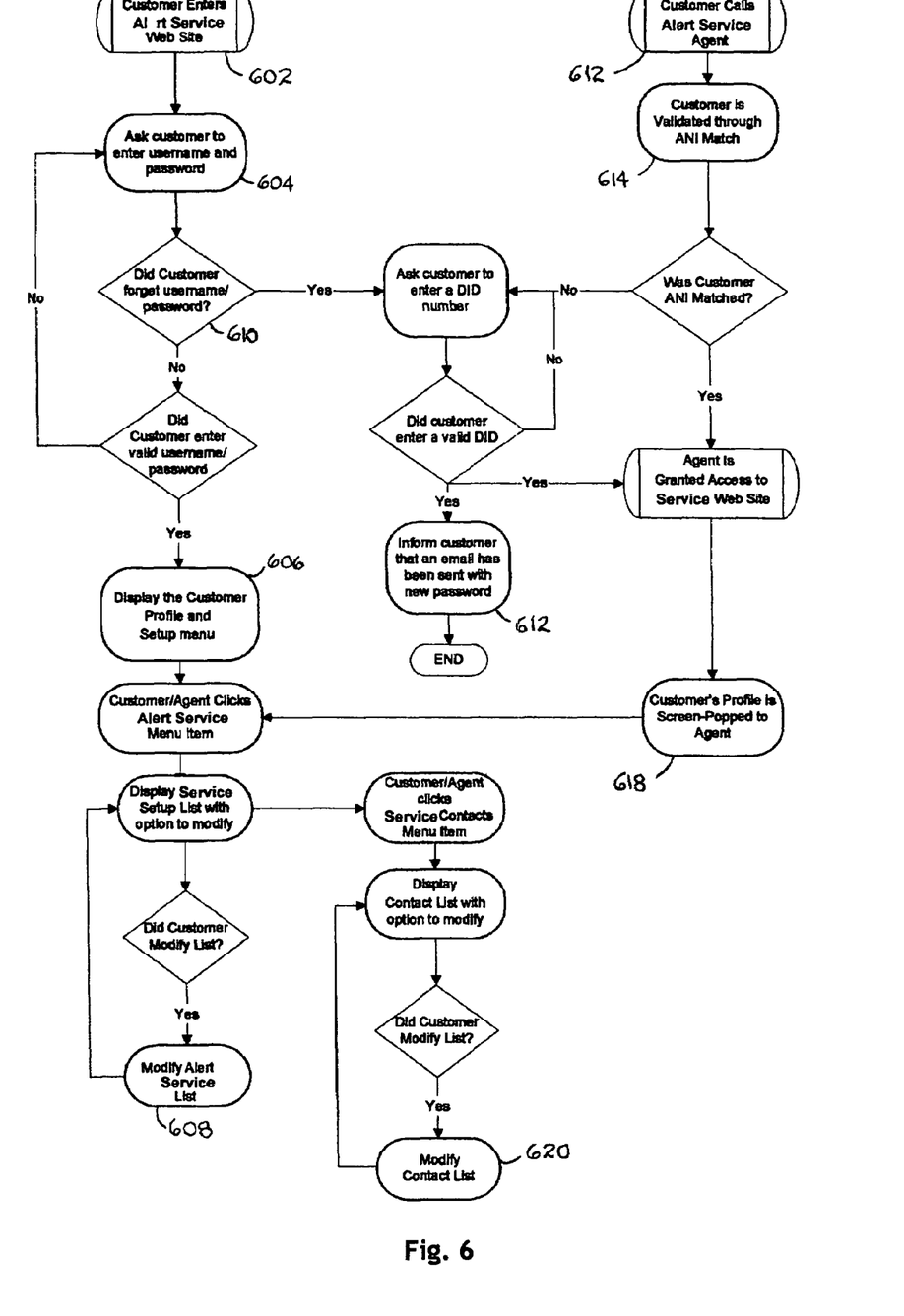

An example of this web-based customer-service interactivity is illustrated in FIG. 6, in which a customer of the service logs onto an alert service web page or web site (602) to set the service up in accordance with the customer's needs. The web page prompts the customer for his "user name," which may correspond to the telephone number, or direct inward dialing ("DID") number of the handset 120, and the password associated with the alert service account (604). If the customer enters the correct name or number and password, he is then presented an alert service setup menu (606) with which he can provision or modify the various options and features of the alert service, such as the time and intervals of the first message, content of the message, telephone numbers in the alert service list, and the like (608). It may also transpire that the customer has lost or forgotten his account password (610), in which case, the customer can arrange, by the provision of the correct DID of the handset, for the dedicated switch 102 to send him a new password via an e-mail (612).

If the customer is uncomfortable with or unable to set up or modify the features of the alert list via the internet himself, he may instead do so through the agency of a telephone call to a customer service representative (614). In this alternative embodiment, the service representative may identify the caller through an automatic number identification ("ANI") process (614), or if he cannot, ask the customer to provide him with the DID number of the handset 120, as above (616). If the customer is identified by ANI, or alternatively, provides the correct DID number and account password to the representative, the representative is given access to the customer's profile on the alert service web page (618), and can then proceed to setup or modify the features and options of the service at the customer's direction (608, 620), as above.

In another possible embodiment of the method in which the dedicated switch 102 is connected to the internet, the switch can be programmed to store voice mails left for the user of the handset 120 on the voice mail server 106 in, or to convert them into, the format of digital sound files, e.g., "*.wav" files, and to transmit them to an e-mail address of the user via the internet. In this way, the user can listen to the voice messages with an e-mail program on his computer without having to listen to them with the handset, and thereby use up credit from the secured or dependent accounts.

As will by now be evident to those of skill in this art, many modifications are possible and may be made to the methods, apparatus and techniques of the present invention without departing from its spirit and scope. Accordingly, the scope of this invention should not be limited to that of the particular embodiments described and illustrated herein, as they are merely exemplary in nature. Rather, the scope of the present invention should commensurate with that of the claims appended hereafter, and their functional equivalents.

What is claimed is:

1. A method for providing a wireless telephone service, the method comprising:
  providing a dedicated programmable wireless telecommunication switch coupled to a public switched telephone network, a voice mail server, and a billing server;

providing a wireless handset having a telephone number associated with it, the handset being capable of telephonic communication with the dedicated switch, and of placing and receiving telephone calls through a secured list of telephone numbers programmed in the dedicated switch;

providing at least two billing accounts associated with the telephone number of the handset to provide substantial control over the cost of non-essential usage and provide substantially inexhaustible emergency communication "safety net", the accounts comprising a secured account having a password and the telephone numbers of the secured list associated with it, and a dependent account having a password associated with it;

detecting the telephone number of a caller of an incoming call to the handset, and if none is detected, then prompting the caller to provide a password;

detecting the telephone number being called in an outbound call from the handset;

debiting the secured account for completed incoming calls to the handset in which the detected number of the caller is on the secured list, or in which the caller provides the password of the secured account, and for completed calls from the handset to telephone numbers on the secured list;

debiting the dependent account for completed incoming calls to the handset in which detected number of the caller is not on the secured list, or in which the caller does not provide the password of the secured account, and for completed outgoing calls from the handset to numbers that are not on the secured list; and detecting credit in at least one of the secured account and the dependent account in response to at least one of the incoming call to the handset or the outbound call from the handset.

2. The method of claim 1, wherein a dependent list of telephone numbers is programmed in the switch, and further comprising:

providing an appropriate level of substantially free credit to complete the at least one of the incoming call to the handset or the outbound call from the handset partially responsive to detection of insufficient credit;

debiting for completed incoming and outgoing calls to and from the handset that are to and from telephone numbers that are on the dependent list; and connecting to emergency numbers regardless of availability of the credit in the dependent account.

3. The method of claim 2, wherein the handset is capable of making calls only to telephone numbers that are on the secured or the dependent lists; and wherein the step of providing an appropriate level of substantially free credit comprises communicating advertisement messages to replenish the credit of at least one of the secured and the dependent accounts.

4. The method of claim 2, wherein the handset is capable of receiving calls only to telephone numbers that are on the secured or the dependent lists and repeatedly communicates a message at selected intervals to a user and upon failure of the user to acknowledge receipt of the message, the message is communicated to another user on a service list.

5. The method of claim 2, wherein the telephone of an incoming caller corresponds to a number of the dependent list, and further comprising:

determining whether the credit is available in the dependent account;

if the credit is not available in the dependent account, providing the caller with an option of recording a voice mail to a user on the voice mail server;

if the credit is available in the dependent account, determining whether the user is available to take the call;

if the user is not available to take the call, providing the caller with an option of recording a voice mail to the user on the voice mail server;

if the user is available to take the call,
connecting the call to the handset;
metering the length of the call; and,
debiting the dependent account for the call.

6. The method of claim 5, the caller leaves a voice mail to the user on the voice mail server, and wherein the dedicated switch is further coupled to the internet, and further comprising:

recording the voice mail as or converting it to a sound file; and, transmitting the sound file to an e-mail address of the user.

7. The method of claim 5, wherein the credit is not available in the dependent account, and further comprising:

providing the caller with an alternative option of adding the credit in the dependent account by listening to a recorded advertising message.

8. The method of claim 2, wherein a user of the handset attempts to make an outgoing call, and wherein the credit is not available in either the dependant or the secured accounts, further comprising:

providing the user with an option of adding credit to either dependent or secured by listening to a recorded advertising message.

9. The method of claim 2, wherein the dedicated switch is further coupled to internet, and further comprising:

providing an interactive web page on the internet through which a customer or a customer's representative can obtain information regarding the customer's account and selected features of the dedicated switch that relate to the customer's account;

logging the customer or customer's representative onto the web page; prompting the customer or customer's representative for the telephone number of the handset;

if the customer or customer s representative provides the telephone of the hand-set, prompting the customer or customer's representative for the password of the secured account or the dependent account; and, if the customer or customer s representative provides the password of the secured account or the dependent account, providing the customer or customer's representative with the status of the secured account or the dependent account and enabling the customer to modify the secured list or the dependent list of telephone numbers online.

10. The method of claim 1, wherein the telephone number of an incoming caller corresponds to a number on the secured list, or the caller provides the secured account password, and further comprising:

determining whether the credit is available in the secured account;

if the credit is not available in the secured account, providing the caller with an option of recording a voice mail to a user on the voice mail server;

if the credit is available in the secured account; determining whether the user is available to take the call;

if the user is not available to take the call, providing the caller with an option of recording a voice mail to the user on the mail server;

if the user is available to take the call, connecting the call to the handset;

metering the length of the call; and, debiting the secured account for the call.

11. The method of claim 10, further comprising: providing the caller with an alternative option of adding credit to the at least one of the secured account and the dependent account in response to listening to a recorded advertising message.

12. The method of claim 10, wherein the caller leaves a voice mail to the user on the voice mail server, and wherein the dedicated switch is further coupled to internet, and further comprising:

recording the voice mail as or converting it to a sound file; and, transmitting the sound file to an e-mail address of the user.

13. The method of claim 1, further comprising:

providing a third billing account associated with the telephone of the handset, the third account comprising an alert service account and having associated with it a password and an alert service list of telephone numbers in the switch;

calling a user at the telephone number thereof at selected times and selected intervals;

if the user answers the call, playing or displaying a first pre-recorded message to the user;

prompting the user to acknowledge receipt of the message;

if the user does not answer the call or does not acknowledge receipt of message within a selected period of time, initiating an escalation process, comprising:

repeating the call to the user at selected intervals thereafter;

sequentially calling the telephone numbers on the alert service list;

if a respondent at one of the numbers on the alert service list answers the call, playing or displaying a second pre-recorded message identifying the user, and stating that the user failed to acknowledge receipt of the first message;

prompting the respondent to acknowledge receipt of the second message; and, continuously repeating the preceding steps until receipt of the first or the second message is acknowledged.

14. The method of claim 13, wherein the first message comprises a reminder to take or administer medications and if the user does not acknowledge, others concerned with the user will be notified of that.

15. The method of claim 13, wherein the dedicated switch is further coupled to internet, and further comprising:

providing an interactive web page on the internet through which a customer or a customer's representative can obtain the customer's account and program selected features of the dedicated switch that relate to the customer's account;

logging the customer or the customer's representative onto the web page;

prompting the customer or customer's representative for the telephone number of the handset;

if the customer or customer's provides telephone number of the handset, prompting the customer for the password of the alert service account; and, if the customer provides the password of the alert account, providing the customer with the status of the alert service account and enabling the customer to the times and intervals of the calls to the user, the message played or displayed to the user, the selected intervals at which repeat calls to the user are made, and the telephone numbers of the alert service list online.

16. The method of claim 1, wherein the dedicated switch is further coupled to internet, and further comprising:

providing an interactive web page on the internet through which a customer or a customer's representative can obtain information regarding the customer's account and program selected features of the dedicated switch that relate to the customer's account;

logging the customer or customer's representative onto the web page;

prompting the customer or customer's representative for the telephone number of the handset;

if the customer or customer's representative provides the telephone number of the handset, prompting the customer or customer's representative for the password of the secured account or the dependent account; and, if the customer or customer's representative provides the password of the secured account or the dependent account, providing the customer or customer's representative with the status of the secured account or the dependent account and enabling the customer or customer's representative to modify the secured list of telephone numbers online.

17. The method of claim 1, wherein at least one of the telephone of the secured list includes a home location telephone number provided by a fixed wire telephone provider, and further comprising:

determining whether the telephone number of the caller of an incoming call to the handset corresponds to a telephone number of the secured list;

if the telephone number of the caller corresponds to a telephone number of the secured list, connecting the call to the handset;

metering the length of the call; and, charging the cost of the call to the location number through the fixed wire provider.

18. The method of claim 17, further comprising:

providing the caller with an option of charging the cost of the call to the home location number through the fixed wire provider.

19. The method of claim 18, further comprising:

prompting the caller for the secured account password.

20. The method of claim 1, wherein at least one of the telephone number of the secured list includes a home location telephone number provided by a fixed wire telephone provider, and further comprising:

determining whether a telephone number being called by the handset corresponds to a number on the secured list;

if the telephone number being called corresponds to a telephone number of the secured list, connecting the call;

metering the length of the call; and, charging the cost of the call to the home location number through the fixed wire provider.

21. The method of claim 20, further comprising:

providing the caller with an option of charging the cost of the call to the home location number through the fixed wire provider.

22. The method of claim 21, further comprising:

prompting the user for the dependent account password.

* * * * *